INVENTORS
ALFORD G. FARNHAM
FELIX P. KLOSEK

Nov. 5, 1957 A. G. FARNHAM ET AL 2,812,364
MANUFACTURE OF DIPHENYLOL METHANES
Filed Sept. 22, 1953 2 Sheets-Sheet 2

INVENTORS
ALFORD G. FARNHAM
FELIX P. KLOSEK
BY
ATTORNEY

United States Patent Office 2,812,364
Patented Nov. 5, 1957

2,812,364

MANUFACTURE OF DIPHENYLOL METHANES

Alford G. Farnham, Caldwell, and Felix P. Klosek, Bloomfield, N. J., assignors to Union Carbide Corporation, a corporation of New York Application September 22, 1953, Serial No. 381,544

9 Claims. (Cl. 260—619)

This invention is with respect to an improved process for reacting together phenol and formaldehyde to produce a reaction product comprising 2,2'-dihydroxy diphenylmethane, 2,4'-dihydroxy diphenylmethane and 4,4'-dihydroxy diphenylmethane and minor amounts of low molecular weight condensation products such as triphenylols and tetraphenylols.

Heretofore it was known that condensation reactions of a molar amount of phenol with less than a mol of formaldehyde in the presence of an acid catalyst led to the production of novolak resins. By greatly increasing the amount of phenol in such reaction, for example by using six mols or more of phenol per mol of formaldehyde semicrystalline to crystalline products were obtained comprising largely a mixture of isomeric dihydroxy diphenylmethanes and minor amounts of relatively low molecular weight novolak-type resins.

In the use of commercial formalin as a surce of formaldehyde for reaction with the six mols or more of phenol, such reaction mixtures together with the usual one percent or less quantity of strong acid catalyst such as hydrochloric acid to impart a pH value of zero to the reaction mixture form a single-phase mixture. Throughout the reaction, and even upon termination of the reaction, the reaction products are all in a single-phase together with the excess unreacted phenol and the water introduced by the use of formalin and that formed during the condensation. The single-phase characteristic at all stages of the reaction process is attributed to the use of the large quantities of phenol functioning as a coupling solvent for the water and the substantially water insoluble dihydroxy diphenylmethanes. The water in the reaction product is best removed by vacuum dehydration which is somewhat time consuming and expensive.

As this reaction is quite exothermic, the practice has been to add the formalin to the phenol in increments in order to maintain average reaction temperatures of about 25–35° C. which are preferred because they favor higher yields of the 4,4'-dihydroxy diphenylmethane isomer, whereas at higher reaction temperatures lower yields of this isomer result. Furthermore, it is not unusual for the reaction to take 10 or more hours time to obtain complete reaction of all the formaldehyde.

Accordingly, one of the objects of the present invention is to obtain high yields of dihydroxy diphenylmethane isomers by reaction of phenol with formaldehyde.

Another object is to reduce the amount of excess phenol required in the reaction system whereby smaller amounts of unreacted phenol need be recovered from the reaction products.

A further object is to react phenol and formaldehyde together under conditions producing a two-phase reaction system, one phase being an aqueous acid layer containing some formaldehyde in solution and the other phase being an organic layer comprising in solution substantially all the phenol in admixture with some of the formaldehyde, the reaction likewise terminating with a two-phase system, one phase being essentially an aqueous solution of acid catalyst and the other phase of organic nature comprising unreacted phenol, isomeric dihydroxy diphenylmethanes and novolak-type condensation products.

Another object is to produce dihydroxy diphenylmethane isomers by reacting together phenol and formaldehyde in a continuous process.

A further object is to continuously react together phenol and formaldehyde under adiabatic conditions.

Another object is to react together, either batchwise or continuously, phenol and formaldehyde under conditions producing a larger yield of 4,4'-dihydroxy diphenylmethane than that of the 2,2'-dihydroxy diphenylmethane and the 2,4'-dihydroxy diphenylmethane isomers which are simultaneously formed in the reaction.

An additional object is to use an acid catalyst in amount to absorb a substantial amount of the heat of reaction formed when phenol and formaldehyde are reacted together.

The attainment of these objects and related objects will be further understood as the description of the invention proceeds together with reference to the accompanying drawing, wherein.

It has now been found that by charging a reaction mixture of phenol and formaldehyde preferably in aqueous form such as formalin, said mixture containing at least 2 mols of phenol and preferably 4 to 5 mols per mol of formaldehyde to a quantity of an aqueous solution of hydrochloric acid or sulphuric acid containing at least 0.1 mol of acid per mol of phenol and that the phenol in the reaction mixture is present in excess of its solubility in the aqueous acid solution, that the resultant two-phase mixture when well mixed or stirred immediately begins to react even at room temperatures (25–30° C.) and continues to complete reaction of all the formaldehyde within about 10 to 15 minutes when reaction temperatures are held at 25°–30° C. and in 5–15 seconds at reaction temperatures of 65–75° C. A two-phase system exists on termination of the reaction in which one phase of organic nature contains substantially all the unreacted phenol, trace amounts of aqueous acid solution and a mixed reaction product comprising predominantly the three crystalline isomeric dihydroxy diphenylmethanes, namely 2,2'-dihydroxy diphenylmethane, 2,4'-dihydroxy diphenylmethane and 4,4'-dihydroxy diphenylmethane and a minor amount of low molecular weight phenol-formaldehyde condensation products such as triphenylols and tetraphenylols, and the other phase is essentially an aqueous solution of the acid catalyst and contains practically all the water derived from the use of aqueous formaldehyde and water of condensation; in addition there will usually be present in the aqueous layer small amounts, 1 to 5% of unreacted phenol. This aqueous layer is readily removed from the organic layer as for example by decantation.

The use of relatively large amounts of acid catalyst is considered a critical factor in obtaining a rapid but controllable reaction between the phenol and the formaldehyde. It is believed that a two-fold function is obtained from such large quantities of acid in that on the one hand with ratios of at least 0.1 mol of acid per mol of phenol enough catalytic effect is had for a rapid reaction to occur, and on the other hand with even greater amounts of acid, that is 0.5 to about 6.0 mols of acid per mol of phenol a substantial amount of the heat of reaction is absorbed and thereby effectively controls the exothermic temperature rise of the reaction mass.

Figure 2:
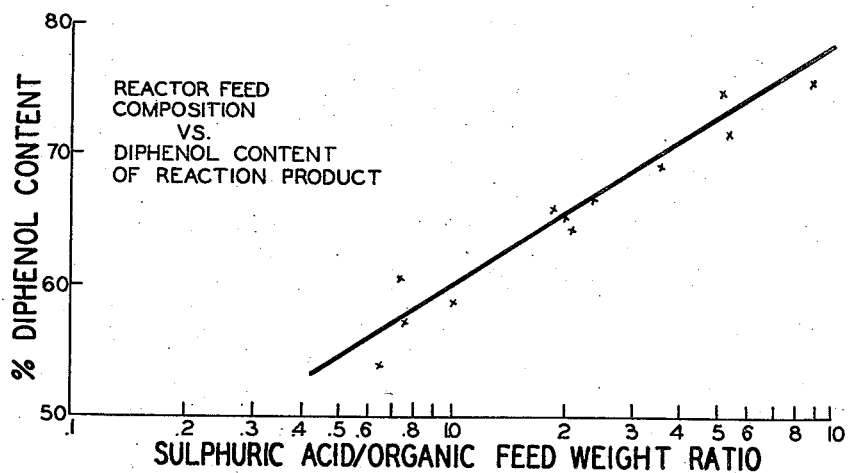
Figure 2 depicts in graphic form the effect of different amounts of acid catalyst on the yield of dihydroxy diphenylmethane isomers.

A further effect which has been observed as being dependent on the amount of acid catalyst employed is that the total yield of dihydroxy diphenylmethanes increases proportionately as more acid catalyst is used, as for example yields of about 55 percent being had with a ratio of 0.25 mol acid catalyst being used per mol of phenol, about 65 percent with one mol acid, and about 80 percent yield with six mols of acid catalyst per mol phenol. This effect is shown in the graph of Figure 2 wherein yields of diphenol (dihydroxy diphenylmethane) are plotted as abscissae and the amount of acid catalyst as ordinates. "Sulphuric acid/Organic Feed Weight Ratio" refers to a 50% aqueous solution of the acid, and "Organic Feed" is a mixture consisting of 16 parts by weight formalin (37.0% formaldehyde) and 100 parts by weight phenol. All reactions were carried out under substantially the same conditions, that is a reaction temperature of 60-65° C. which was maintained for 15-30 seconds.

To avoid losses of phenol in the form of by-products as by reaction of the phenol with the acid catalyst for example sulphonation of phenol in the use of sulphuric acid as the catalyst, it has been found expedient to have present in the reaction mixture of phenol and formaldehyde at least about four mols of water per mol of acid. This water can be supplied in whole or in part from the use of aqueous solutions of formaldehyde or by preliminary dilution of the acid with water or by the direct addition of water to the reaction system.

Figure 3:
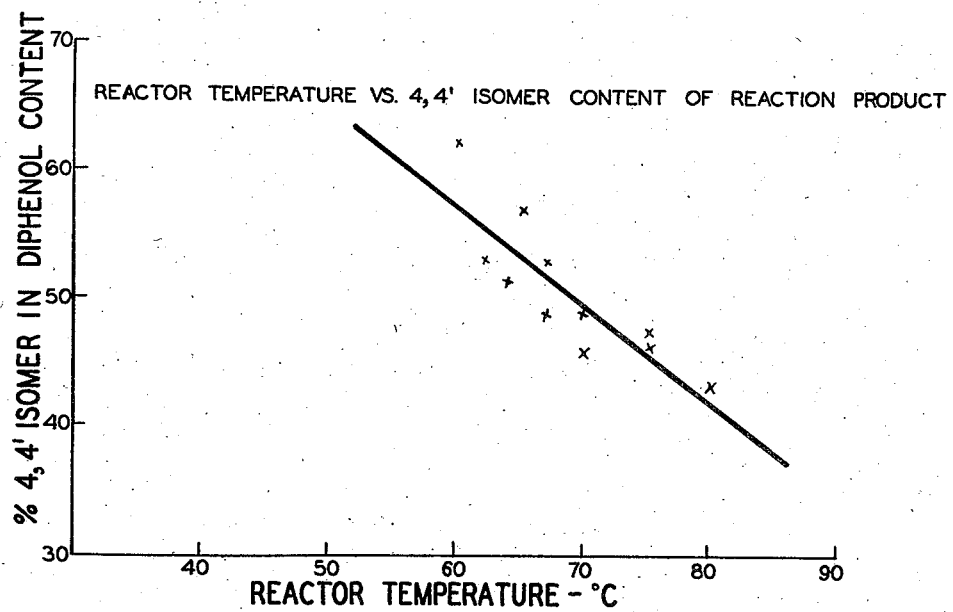
Figure 3 shows in graphic form the effect of different reaction temperatures on the yield of the 4,4'-dihydroxy diphenylmethane isomer.

The temperature at which the reaction between the phenol and the formaldehyde is conducted has been stated before as being between about 25° C. and the refluxing temperature of the mixture, the latter of course is dependent on the pressure maintained in the reaction apparatus usually being about 110° C. at atmospheric pressure. However, it has been found that the yield of the preferred 4,4'-dihydroxy diphenylmethane isomer tends to decrease the higher the reaction temperature. For example, in a typical reaction carried out at 80° C. the 4,4'-isomer constituted about 44% by weight of the dihydroxy diphenylmethanes produced, whereas at a reaction temperature of 60° C., the 4,4'-isomer was about 55% of the yield of all isomers. On the other hand, the total yield of dihydroxy diphenylmethane isomers appears to be essentially independent of the reaction temperature. Typical yields of the 4,4'-dihydroxy diphenyl methane isomer are illustrated by the plotted data in the graph of Figure 3. The data were derived from experiments using the same reaction ratio of phenol to formalin of 100 to 16 parts by weight, throughout and with two volumes of 50% aqueous sulphuric acid per volume of the phenol-formaldehyde reaction mixture.

Figure 1:
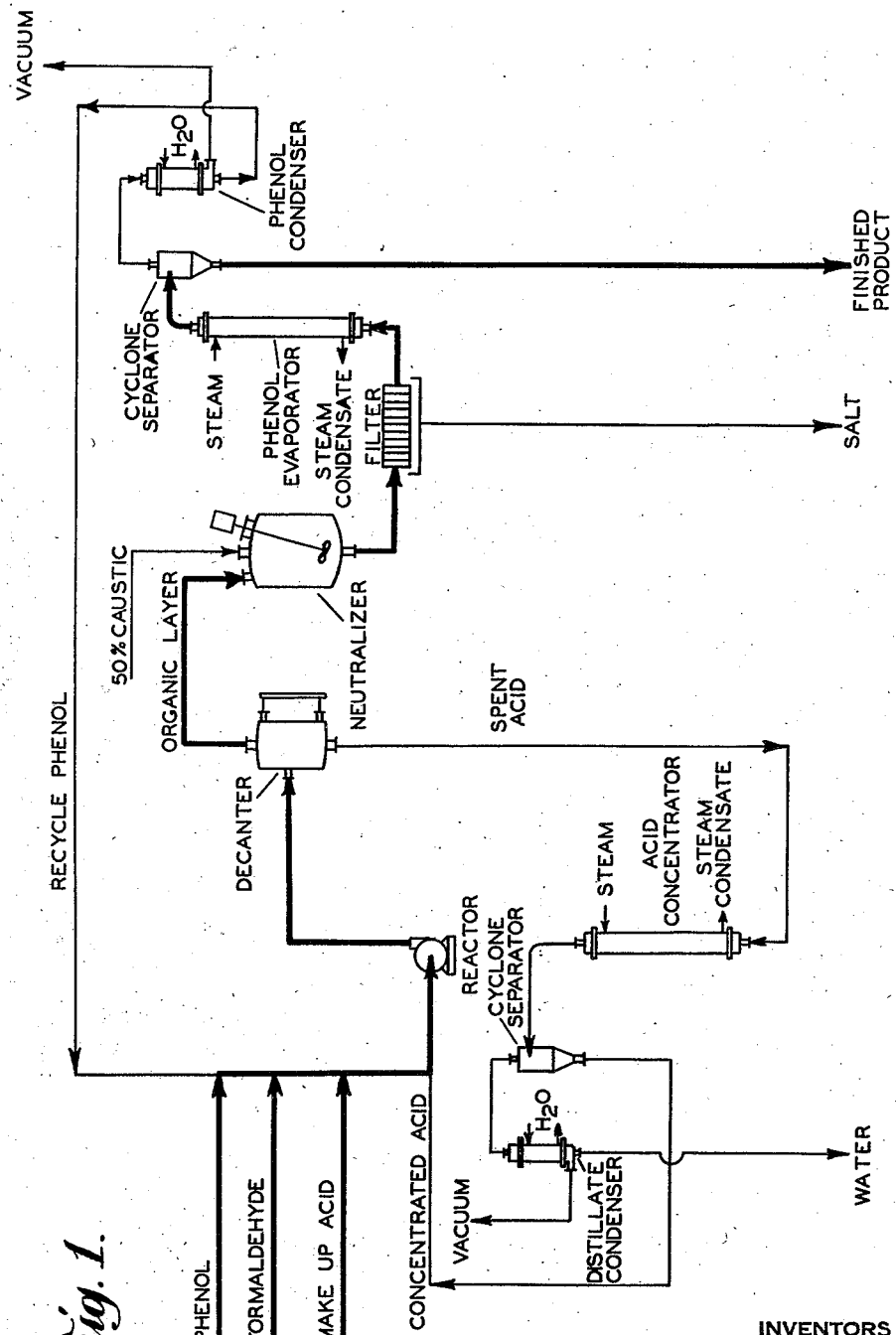
Figure 1 illustrates diagrammatically a continuous process for reacting phenol and formaldehyde together in the presence of an acid catalyst.

Referring now to Figure 1, the general scheme of operations for continuously producing dihydroxy diphenylmethanes comprises mixing together streams of phenol and formaldehyde in the required proportions as herein described, with the temperature of such mixture being regulated to preferably below about 35° C. The required volumes of water and acid are added to the phenol-formalin mixture and all are simultaneously fed to a reactor having agitating means, a suitable reactor being as shown, a centrifugal pump with reversed rotation to improve the agitation. The acidified mixture is held for an average residence time of about 15-30 seconds in the pump reactor, during which time interval the reaction mixture's temperature rises exothermically about 20 to 35° C. from the mixture's ambient or initial temperature and during which substantially all the formaldehyde reacts with the phenol. The reactor constantly discharges a two-phase organic-water mixture to a decanter. The water layer containing practically all the acid catalyst together with the water of condensation and the water contained in the formalin is fed to a steam heated tubular evaporator to heat the acid-water mixture to its boiling point under sub-atmospheric pressure whereby a mixture of acid liquid and steam vapor is discharged therefrom to a cyclone separator. Partially to completely concentrated acid is discharged from the bottom of the cyclone separator for recycling with fresh phenol and formalin to the reactor, and the steam vapor is discharged to a distillate condenser for removal from the system. The steam vapor discharged from the acid liquid usually contains a very small amount of phenol, being of the order of about one to five percent. This phenol can be recovered from the condensed steam by further distillation procedures as is known to the art.

Since not all of the acid catalyst is present in the water layer obtained from the decanter, a small amount being dispersed in the organic layer, the recovered concentrated acid is continuously supplemented with a feed of fresh acid to make up the difference and maintain a uniform acid catalyst concentration feed to the phenol-formalin mixture.

The organic layer, consisting of unreacted phenol, isomeric dihydroxy diphenylmethanes and higher resinous Novolak-type condensation products and a small amount of acid catalyst is piped to a neutralizer tank wherein the residual acid catalyst is neutralized, a 50 percent aqueous solution of sodium hydroxide being satisfactory, although other equivalent alkalis such as lime, zinc oxide may be used. In the instance of sodium hydroxide or lime, or zinc oxide as neutralizers, the resultant sulphate salts are insoluble in the organic layer, and they are easily removed by passing the neutralized mixture through a plate filter. When hydrochloric acid is used it may be removed by vaporization and no neutralization step is necessary.

The neutralized and filtered organic layer is then passed through a phenol evaporator comprising a steam heated tubular evaporator in which the organic layer while subjected to sub-atmospheric pressure is heated to a phenol vaporizing temperature, and from which discharge is had to a cyclone separator wherein phenol vapor separates from the liquid organic matter. The phenol vapor is then conducted to a condenser and the distillate is recycled to be mixed with fresh incoming phenol reactant.

The liquid organic matter discharged as finished product from the cyclone separator upon cooling to room temperature forms a coherent crystalline mass. The finished product dependent on operating conditions such as phenol to formaldehyde ratio, acid catalyst content, and reaction temperatures will vary in total dihydroxy diphenylmethane content from about 55 to 75 percent by weight of the finished product, the balance being resinous novolak condensation products and about one percent of unreacted phenol. Of the total content of dihydroxy diphenylmethanes, the isomer 4,4'-dihydroxy diphenylmethane usually constitutes between 50 to 65 percent by weight of the total. This finished product without further purification is useful for the preparation of epoxy derivatives by reaction with epichlorhydrin.

The 4,4'-dihydroxy diphenylmethane can be separated from the other components in the finished product as by dissolving 200 grams of the finished product in 150 cc. of hot 40% aqueous acetic acid; on cooling of this solution crystals of 4,4'-dihydroxy diphenylmethane having a melting point of 156°-158° C. separate out.

In the following examples typical, illustrative data are given for steady stable operating conditions during a continuous run of seven days.

*Example 1*

In the reactor feed stage of an apparatus as illustrated in Fig. 1 there was fed at the rate of 86 pounds per hour a feed mixture (temperature 20-30° C.) consisting of 100 parts by weight of phenol and 16 parts by weight of formalin (37% formaldehyde, by weight). Recycle 50% aqueous sulphuric acid at the rate of 150 pounds per hour and 75% aqueous sulphuric acid at the rate of 0.6 pound per hour as make-up acid were fed to the reaction mixture of phenol and formalin. The temperature of the reaction mixture of phenol and formalin in the reactor pump varied slightly between 65° C. and 70° C. and average residence time in the reactor was 30 seconds. The reacted mixture was continuously discharged from the reactor pump to the decanter for phase separation; preferably the temperature of the reacted mixture is adjusted to between 55° and 65° C. to facilitate separation. The organic layer as separated there amounted to 72 pounds per hour. The organic layer was then neutralized with 50% aqueous sodium hydroxide solution to a pH value between 4 and 6, the neutralization step consuming 1.09 pounds of the caustic solution per hour. The neutralized organic layer was then filtered to remove salts insoluble in the organic layer. The filtered organic layer at the rate of 68 pounds per hour passed through a four pass tube and shell heat exchanger and then through a cyclone separator, both at 100° C. vapor temperature and 25 mm. Hg pressure to distill off phenol for recycling at the rate of 45 pounds per hour. Finished product consisting essentially of phenol-formaldehyde condensation products was removed from the system at the rate of 23 pounds per hour. The acid water layer separating out in the decanter as a 47% aqueous solution of sulphuric acid was concentrated to a 50% aqueous solution by being passed through an evaporator at 80°–85° C. vapor temperature and 30–40 mm. Hg pressure. The finished product had an average molecular weight between 225 and 250, and by analysis a total dihydroxy diphenylmethane content of 68% by weight, of which 50% thereof was 4,4'-dihydroxy diphenylmethane, and a content of unreacted phenol of 0.9% by weight of the finished product.

The utility of hydrochloric acid as a catalyst is demonstrated in the following example which also shows that rapid reaction can be had in a batch type process and with the formalin being added in increments to a two-phase mixture of phenol and concentrated hydrochloric acid.

*Example 2*

To a two-phase mixture consisting of 2000 g. phenol, 2700 g. 37% hydrochloric acid and 1300 g. water was added over one hour dropwise with stirring at 25–30° C. 292 g. formalin. After standing a further 1.5 hour the phenol-resin top layer was separated, washed once with water then unchanged phenol distilled off under vacuum to 180° C. at about 28" vacuum. Residue yield 633 g. (176 g./mole CH₂O).

200 g. of the above product was dissolved in 150 cc. of hot 40% aqueous acetic acid. On cooling 49.5 g. crystalline 4,4'-diphenylolmethane was obtained M. P. 156–158°.

Another sample of the same product was subjected to distillation analysis. The following fractions were obtained:

Percent phenol to 150° V. T./.5 mm _____ 0
Percent diphenol B. P. 170–210°/.5 mm _____ 65.7
Percent residue resin to 265° pot temp./.5 mm ____ 33.6

The diphenol fraction had a melting point range of 90–96–135°. This corresponds to an estimated composition of:

10.5% 2,2'-dihydroxy diphenylmethane
36.5% 2,4'-dihydroxy diphenylmethane
53% 4,4'-dihydroxy diphenylmethane In order to obtain commercially rapid reaction rates between the phenol and formaldehyde, it is desirable to use fairly strong aqueous acid solutions as for example at least 12% aqueous hydrochloric acid or at least 35% aqueous sulphuric acid. The use of aqueous sulphuric acid solutions higher than 70% concentration should be avoided to prevent losses of phenol caused by sulphonation. Sulphuric acid solutions between 45 and 55% concentration are preferred since they effect rapid reactions of all the formaldehyde and can easily be reconcentrated to original concentration value.

As illustrated by Figure 2, the yield of dihydroxy diphenylmethanes increases as more aqueous acid catalyst is employed per unit volume of the phenol and formaldehyde reaction charge. In the use of sulphuric acid of 45 to 55% concentration the best results from the several aspects of yield and reaction rates and overall efficiency result when the parts by weight of the aqueous sulphuric acid are at least about equal and preferably twice the weight of the reaction charge of phenol and formalin. However, the reaction can be successfully carried out with 10 or more parts of 45–55% aqueous sulphuric acid per part of phenol-formalin reaction charge.

We claim:

1. Process for producing dihydroxy diphenylmethanes which comprises forming a two-phase mixture by mixing a reaction charge containing a molar amount of formaldehyde and at least two mols of phenol with an aqueous solution of an acid selected from the group consisting of sulphuric acid and hydrochloric acid, said aqueous solution containing between 0.25 and 6 mols of acid per mol of phenol, the phenol in the reaction charge being present in excess of its solubility in the aqueous acid solution, said two phase mixture containing a total of at least four mols water per mol of acid, then heating to a reaction temperature the two-phase mixture while being vigorously mixed to cause condensation of the phenol with the formaldehyde to produce dihydroxy diphenylmethanes then separating the organic phase containing said dihydroxy diphenyl methanes from the aqueous acid phase.

2. Process for producing dihydroxy diphenylmethanes which comprises forming a two-phase mixture by mixing a reaction charge containing a molar amount of aqueous formaldehyde and at least two mols of phenol with an aqueous solution of an acid selected from the group consisting of sulphuric acid and hydrochloric acid, and containing at least about 0.25 mol of acid per mol of phenol in the reaction charge, the phenol in the reaction charge being present in excess of its solubility in the aqueous acid solution, the water in said reaction charge being a total of at least four mols per mol of acid, vigorously mixing the two-phase mixture while heating it to a reaction temperature to cause the phenol to react with the formaldehyde to form condensation products insoluble in the aqueous acid solution and containing dihydroxy diphenyl methanes, and then recovering said condensation products from the reaction mixture.

3. Process for producing dihydroxy diphenylmethanes which comprises forming a two-phase mixture by mixing a reaction charge containing a molar amount of aqueous formaldehyde and at least two mols of phenol with an aqueous solution of an acid selected from the group consisting of sulphuric acid and hydrochloric acid, and containing at least about 0.25 mol of acid per mol of phenol in the reaction charge, the phenol in the reaction charge being present in excess of its solubility in the aqueous acid solution, the water in said reaction charge being a total of at least four mols per mol of acid, vigorously mixing the two-phase mixture while heating it to a reaction temperature to cause the phenol to react with the formaldehyde to form condensation products insoluble in the aqueous acid solution, separating the condensation products from the aqueous acid solution, and then removing unreacted phenol from the condensation products.

4. Process for reacting together phenol and formaldehyde which comprises forming a two-phase reaction mixture by mixing a reaction charge of one mol formaldehyde and at least two mols phenol with an aqueous solution of sulphuric acid containing at least 0.25 mole of acid per mol of phenol in which the phenol of the reaction charge is not completely soluble thereby forming a two-phase mixture, the water in said reaction charge being a total of at least four mols per mol of acid, heating to a reaction temperature the two-phase mixture while being mixed together to cause condensation of the phenol with formaldehyde thereby forming water-insoluble condensation products comprising in major amount a mixture of dihydroxy diphenyl methanes, and recovering said products from the reaction mixture.

5. Continuous process for producing dihydroxy diphenylmethanes, which comprises continuously mixing at a reaction temperature a reaction charge containing a molar amount of formaldehyde and at least two mols phenol with an aqueous solution of an acid containing at least 0.25 mole of acid per mol of phenol selected from the group consisting of sulphuric acid and hydrochloric acid in which the phenol of the reaction charge is not completely soluble, thereby forming a two-phase mixture, the water in said reaction charge being a total of at least four mols per mol of acid, reacting the two-phase mixture to cause condensation of the phenol with the formaldehyde and yielding a reacted mixture comprising an organic layer containing isomeric dihydroxy diphenylmethanes, resinous novolak-type condensation products, and excess unreacted phenol and a small amount of acid, and an aqueous layer comprising essentially an aqueous solution of the acid, separating the organic layer from the aqueous layer, and continuously recycling the aqueous acid layer to a fresh reaction charge of phenol and formaldehyde.

6. Continuous process for producing dihydroxy diphenylmethanes, which comprises continuously mixing at a reaction temperature a reaction charge containing a molar amount of formaldehyde and at least two mols phenol with an aqueous solution of an acid containing at least 0.25 mole of acid per mol of phenol selected from the group consisting of sulphuric acid and hydrochloric acid in which the phenol of the reaction charge is not completely soluble, thereby forming a two-phase mixture, the water in said reaction charge being a total of at least four mols per mol of acid, reacting the two-phase mixture to cause condensation of the phenol with the formaldehyde and yielding a reacted mixture comprising an organic layer containing isomeric dihydroxy diphenylmethanes, resinous novolak-type condensation products, and excess unreacted phenol and a small amount of acid, and an aqueous layer comprising essentially an aqueous solution of the acid, separating the organic layer from the aqueous layer, concentrating the aqueous acid layer to its original acid concentration and recycling the concentrated acid to a fresh reaction charge of phenol and formaldehyde.

7. Process for producing dihydroxy diphenylmethanes which comprises mixing together at a reaction temperature a reaction charge containing a mol of formaldehyde and at least two mols of phenol with an aqueous solution of an acid selected from the group consisting of sulphuric acid and hydrochloric acid, said acid solution containing at least 0.25 mol of acid per mol of phenol and the reaction charge containing more phenol than is soluble in the aqueous acid solution, the water in said reaction charge being a total of at least four mols per mol of acid, reacting the mixture to form a two-phase reaction mass of which one phase contains a mixture of isomeric dihydroxy diphenylmethanes and unreacted phenol and the other phase is essentially an aqueous solution of the acid and then recovering the dihydroxy diphenyl methanes from the reaction mass.

8. Process for producing dihydroxy diphenylmethanes which comprises mixing together at a reaction temperature a reaction charge containing a mol of formaldehyde and at least two mols of phenol with an aqueous solution of an acid selected from the group consisting of hydrochloric acid and sulphuric acid, said acid solution containing between 0.5 and 6 mols of acid per mol of phenol in the reaction charge, the water in said reaction charge being a total of at least four mols per mol of acid, reacting the mixture to form a two-phase reaction mass of which one phase contains a mixture of isomeric dihydroxy diphenylmethanes and unreacted phenol and the other phase contains the aqueous acid solution and then recovering the dihydroxy diphenyl methanes from the reaction mass.

9. Process for producing dihydroxy diphenylmethanes which comprises mixing together at a reaction temperature a reaction charge containing a mol of formaldehyde as formalin and at least two mols of phenol with at least an equal amount by weight of the reaction charge of a 45 to 55% aqueous solution of sulphuric acid reacting the mixture to form a two-phase reaction mass of which one phase contains a mixture of isomeric dihydroxy diphenylmethanes and the other phase contains the aqueous acid solution and then recovering the dihydroxy diphenyl methanes from the reaction mass.

References Cited in the file of this patent

UNITED STATES PATENTS

| | | |
|---|---|---|
| 1,977,627 | Greenhalgh | Oct. 23, 1934 |
| 2,468,982 | Jansen | May 3, 1949 |

OTHER REFERENCES

Megson et al.: Jour. Soc. Chem. Industry, vol. 49 (May 30, 1930), p. 251 T (1 p. only).